(12) United States Patent
Tokuhashi et al.

(10) Patent No.: US 6,331,841 B1
(45) Date of Patent: *Dec. 18, 2001

(54) IMAGE DISPLAY SYSTEM

(75) Inventors: Yuki Tokuhashi; Naoto Shimada, both of Hachioji (JP)

(73) Assignee: Olympus Optical Company Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/580,446

(22) Filed: May 25, 2000

Related U.S. Application Data (63) Continuation of application No. 08/529,462, filed on Sep. 18, 1995, now Pat. No. 6,137,457.

(30) Foreign Application Priority Data

Sep. 19, 1994 (JP) ................................................ 6-223247

(51) Int. Cl.$^7$ ........................................................ G09G 5/00
(52) U.S. Cl. ............................... 345/8; 345/1.1; 359/630; 439/49
(58) Field of Search .................... 345/7–8, 1–2, 345/903; 359/630–631, 629; 439/39, 49, 43–46

(56) References Cited

U.S. PATENT DOCUMENTS

| | | | |
|---|---|---|---|
| 5,034,809 | 7/1991 | Katoh | 348/53 |
| 5,117,225 | 5/1992 | Wang | 345/2 |
| 5,276,471 | 1/1994 | Yamauchi et al. | 351/153 |
| 5,579,026 | 11/1996 | Tabata | 345/8 |
| 5,991,085 | * 11/1999 | Rallison et al. | 359/630 |

FOREIGN PATENT DOCUMENTS

| | | |
|---|---|---|
| 2148077A | 5/1985 | (GB) . |
| 426289A | 1/1992 | (JP) . |
| 652288U | 7/1994 | (JP) . |

* cited by examiner

*Primary Examiner*—Richard Hjerpe
*Assistant Examiner*—Francis Nguyen
(74) *Attorney, Agent, or Firm*—Stevens, Davis, Miller & Mosher, LLP (57) ABSTRACT

An image display system for viewing an electronic image and an external sight simultaneously, which includes image display units which have an individual controller for outputting image signals to a display unit. The display unit enables a switching operation with a predetermined operation mode from a plurality of operation modes, including a mode for indicating the image signals output from the individual controller. An external control device outputs mode control signals which address the operation mode of the display unit and are received by an external control terminal. A mode exchanging switch specifies a condition of the mode control signal. A detection unit detects whether the external control terminal is connected to a connector capable of outputting a mode control signal. The individual controllers are connected to the external control terminals in turn so as to couple the controllers to the external control device in series. The operation modes can be collectively and forcibly controlled by the individual controllers on the basis of mode control signals received by the external control unit.

6 Claims, 7 Drawing Sheets

FIG_6

FIG_7

FIG. 8

FIG_9

FIG. 10

IMAGE DISPLAY SYSTEM

This is a continuation of application Ser. No. 08/529,462, filed Sep. 18, 1995 now U.S. Pat. No. 6,137,457.

BACKGROUND OF THE INVENTION

1. Field of the Invention

The present invention related to an image display system capable of viewing an electronic image and an external sight simultaneously, or selectively.

2. Related Art Statement

Hitherto, there has been provided a head mounted display (hereinafter, referred to as an HMD) having for example a see-through function capable of viewing not only an electronic image, but also an external sight (for example, refer to Japanese Patent Application Opened Nos. 281,891/90 and 26,289/92).

For example, Japanese Utility Model Application No. 52,288/94 discloses an image display system in which a plurality of see-through HMDs can be connected to a controller for outputting image signals, a third party other than a viewer can control through the controller one operation mode which renders a given electronic image viewable to all viewers or an other operation mode which renders an external sight viewable to all viewers.

According to such an image display system, there is an advantageous effect that for example, when applying the system as a service for passengers on a passenger airplane, in the case of the taking-off and landing of the airplane, a given electronic image such as "fasten seat belt" can be forcibly viewed, or when applying education, it can be rendered that all persons present at a lecture pay attention to a blackboard forcibly, or it can be rendered that all of them view an electronic image of a given problem forcibly.

The present inventors found that there are points to be improved in the above image display system. That is, in the above image display system, a plurality of HMDs are connected to only one controller, so that the number of HMDs are limited. The controller itself for controlling the image signals also has a function for controlling the operation mode of the HMD forcibly from the outside, so that it is necessary to provide a circuit for generating such a forcible control signal in the controller. However, such forcible control circuits or the like are efficient in the case of using a plurality of HMDs, but these circuits are not necessary in the case of using only one HMD, so that in such only one HMD utilization, the system construction becomes uneconomical.

SUMMARY OF THE INVENTION

It is an object of the present invention to eliminate the above described disadvantages of the conventional image display system.

It is another object of the present invention to provide an image display system capable of adapting the number of the HMDs easily, and capable of constructing the image display system economically in the case of individual use.

According to the present invention, there is provided an image display system comprising a plurality of image display units including a controller for outputting image signals and at least one display means capable of enabling switching operation with a predetermined operation mode of a plurality of operation modes including a mode for indicating the image signals from the controller; an external control device for outputting mode control signals which address the operation mode of the display means; the controller of the respective image display units being provided with an external control terminal for receiving the mode control signals and an output terminal for outputting the mode control signals supplied to the external control terminal; the outputs of different controllers are connected to the external control terminals thereof in turn so as to couple the plurality of controllers to the external control device in series, the remained control terminals are connected to the external control device, and the operation modes of whole display means are collectively and forcibly and/or individually controlled through the respective controllers on the basis of the mode control signals from the external control means.

According to the present invention, it is preferable to automatically switch the control of the operation mode due to respective external control units themselves and collective control of the operation mode due to respective external control unit, in the point that the system further comprises a detecting means for detecting whether the external control terminals of respective controllers are coupled to the external control device or not, and a priority order of a collective and forcible control of the operation mode of display means corresponding to the controller due to the mode control signals from the external control device and an individual control of the operation mode of the corresponding display device due to respective image display units themselves is determined on the basis of the output of the detecting means.

In an embodiment of the image display system according to the present invention, it is preferable to optionally switch the collective control of operation mode of whole display means due to respective image display unit and the control of operation mode of the display means corresponding to the respective image display units themselves, in the point that the mode control signal from the external control device includes a signal for addressing a priority order of a collective control of operation modes of display means by the external control device and an individual control of the operation mode of the corresponding display device due to respective image display units themselves.

According to the present invention, the plural operation modes include the see-through operation mode. The external control device is formed by the computer or the remote controller. The image display means comprises image display elements for displaying electronic image, an optical system including a beam splitter for leading the electronic images displayed on the image display elements on eyes of the viewer, and a shutter means disposed at the opposite side to the eyes of the viewer for the beam splitter, as well as the plural operation modes include the normal mode for rendering the shutter means to shielding condition and for displaying the electronic image on the image display elements; the superimposition mode for rendering the shutter means to transmitting condition and for displaying the electronic image on the image display elements; and the see-through mode for rendering the shutter means to transmitting condition and for not displaying the electronic image on the image display elements.

In respective image display units of the present invention, the controller for outputting image signals and at least one display means capable of enabling switching operation with predetermined operation mode of operation modes including the mode for displaying image signals from the controller are made a pair of elements, so that it is possible to operate the display means with the predetermined operation mode in the case of using a unit level. Moreover, respective controllers are provided with an external control terminal for receiving the mode control signals and an output terminal for outputting the mode control signals supplied to the external control terminal, so that if the outputs of different controllers are connected to the external control terminal in turn so as to couple the plurality of controllers to the external control device in series, and the remained control terminals are connected to the external control device, the external control terminals of respective controllers may be coupled to the external control device in parallel. Therefore, the operation modes of whole display means can be collectively controlled through the respective controllers on the basis of the mode control signals from the external control means.

According to the present invention, the controller of the plural image display units each having the controller and at least one display means is connected in series to one external control device through the external control terminal and the output terminal of respective controllers, so that the external control device may control collectively and forcibly the operation modes of whole display means through respective controllers, and thus may correspond easily to the number of the image display units, that is, the number of display means. Also, it is not necessary for the controller itself of respective image display units to have a function of forcibly controlling the operation modes of the display means externally, so that the system construction of respective image display units may be made cheap.

DETAILED EXPLANATION OF THE PREFERRED EMBODIMENTS

Now to the drawings, there are shown various embodiments of an image display system according to the present invention. Like parts are shown by corresponding reference characters throughout several views of the drawings.

Figure 1:
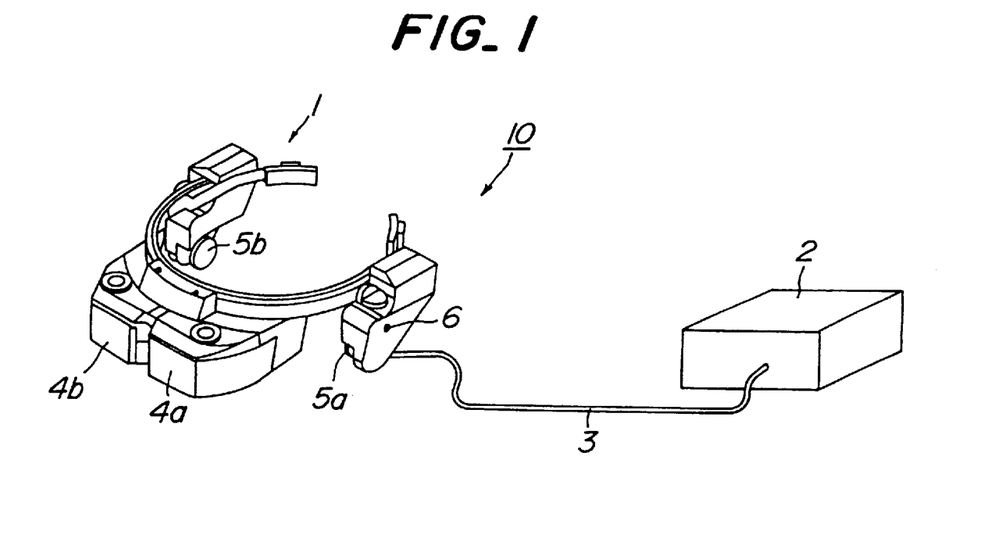
FIG. 1 is a perspective view showing the construction of one embodiment of an image display unit used in embodiments of an image display system according to the present invention.

FIG. 1 is an perspective view showing a construction of one embodiment of an image display unit used in a first embodiment of an image display system according to the present invention. The image display unit 10 comprises an HMD 1 constructing at least one display means, a controller 2 for controlling the operation modes of the HMD 1, and a cable 3 for connecting these HMDs and the controller. The HMD 1 comprises right and left projection optical systems 4a, 4b, right and left ear-phones 5a, 5b and a switch 6 for switching the operation modes. The controller 2 also comprises circuits for supplying required power, image signal and voice signals or the like to the HMD 1 through the cable 3, and a mode switching unit. The controller 2 also includes an external control terminal for receiving mode control signals from an external control device described later and an output terminal for outputting the mode control signals inputted from the external control device. The HMD 1 or the controller 2 is provided with a mode switching unit 6 provided on the HMD 1 or a mode switching control circuit for controlling the operation mode in the HMD 1 on the basis of the mode control signals from the mode switching unit 6 provided on the controller 2 or of the mode control signal from the external control device.

Figure 2:
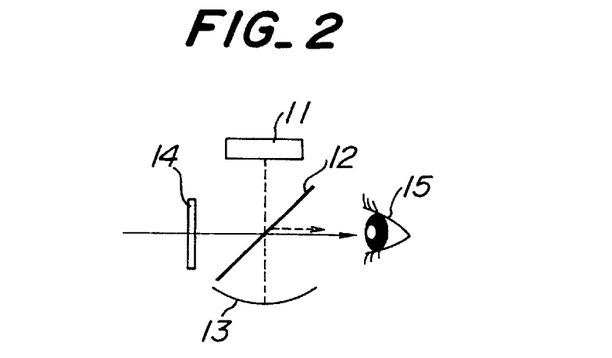
FIG. 2 is an explanatory view showing the construction of one embodiment of a projection optical system of the HMD shown in FIG. 1.

Each of right and left projection optical systems 4a, 4b comprises, for example, as shown in FIG. 2, a liquid crystal element 11 (hereinafter, referred to as LCD), a half-mirror 12, a concave mirror 13 and a liquid crystal shutter 14, and is constructed in such a manner that the image displayed by the LCD 11 is transmitted through the half-mirror 12 and magnified by the concave mirror 13 and then reflected on the half-mirror 12 and observed by eyes 15 of the user and that the external field light can be led onto eyes 15 by transmitting it through the liquid crystal shutter 14 and the half-mirror 12.

Figure 3:
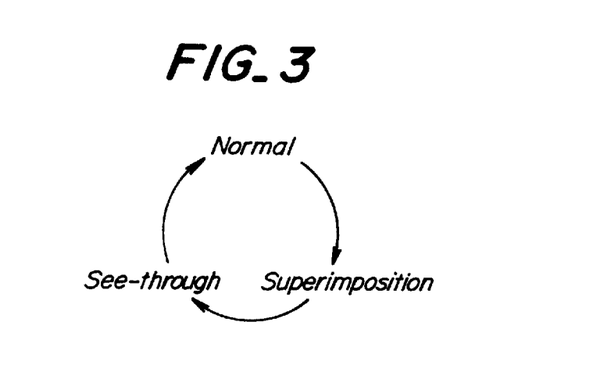
FIG. 3 is an explanatory view explaining the switching order of operation modes of the HMD shown in FIG. 1.

In this embodiment, the LCD 11 of the HMD 1 and the liquid crystal shutter 14 are on/off-controlled by the mode switching control circuit on the basis of the mode switching signal, in such a manner that the HMD 1 is selectively operated with three modes shown in Table 1, that is, a normal mode (N) for observing only the image displayed on the LCD 11, a superimposition mode (SI) for observing a superimposed image of an image displayed on the LCD 11 and an external field light, and a see-through mode (ST) for observing only the external field light. In an individual use of the image display unit 10, these modes are so controlled that they are switched for example in the order shown in FIG. 3 through the mode switching control circuit with every mode switching by the operation of the mode switching unit 6 provided on the HMD 1 or the mode switching unit (not shown) provided on the controller 2.

TABLE 1

| Liquid Crystal Shutter | LCD | Operation Mode |
| --- | --- | --- |
| OFF (Light Shut-off) | ON (Image Display) | Normal (N) |
| ON (Light Transmission) | ON | Superimposition (SI) |
| ON | OFF (Dark-field) | See-through (ST) |

Figure 4:
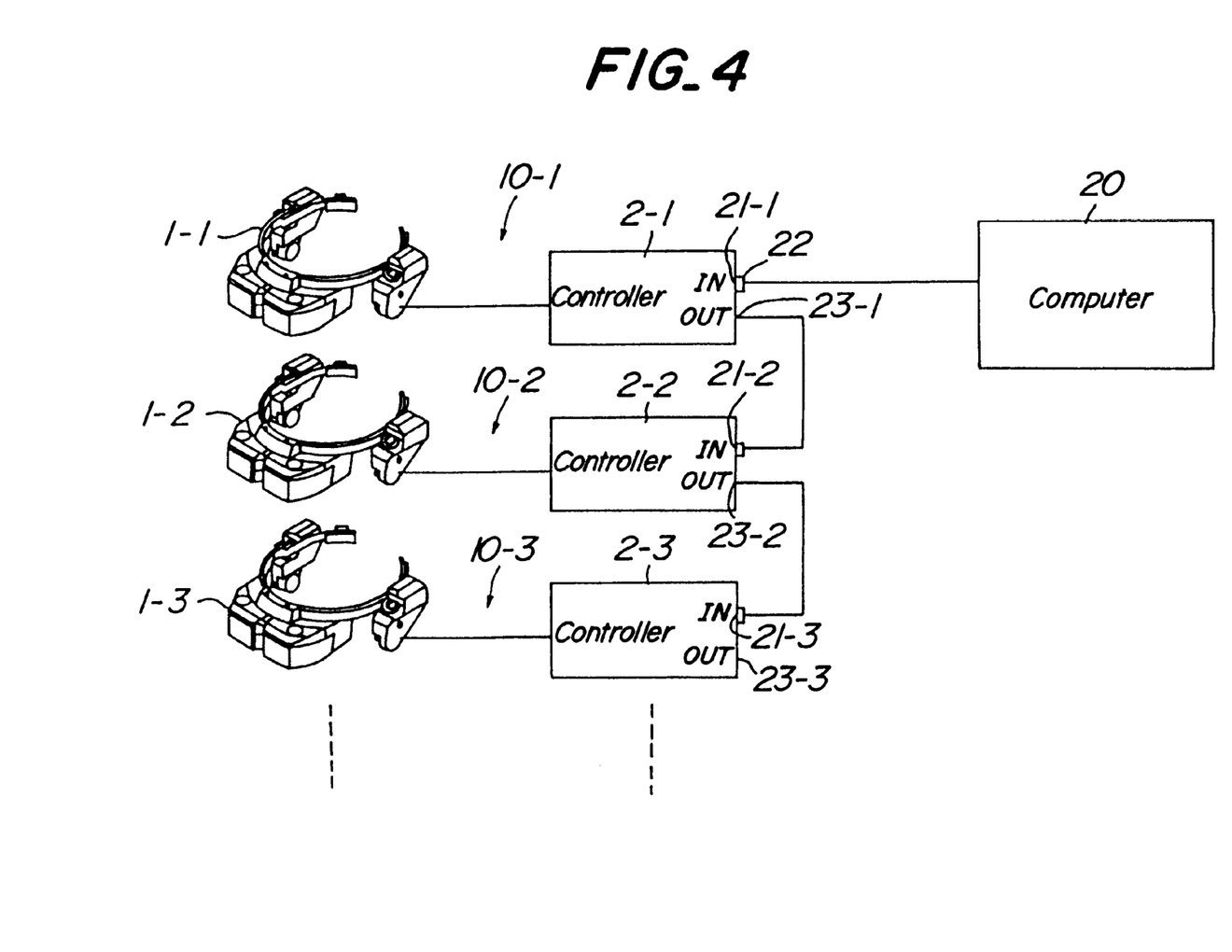
FIG. 4 is an explanatory view showing the construction of a first embodiment of the image display system according to the present invention.

FIG. 4 shows a construction of the image display system in a first embodiment of the present invention. In this embodiment, a plurality of image display units 10-1, 10-2, 10-3, . . . , each having the construction shown in FIG. 1 is coupled to the computer 20 as an external control device, the operation modes of the HMDs 1-1, 1-2, 1-3, . . . , in respective image display units are collectively and forcibly controlled through the corresponding controllers 2-1, 2-2, 2-3, . . . , on the basis of the mode control signal of 2 bits from the computer 20.

To this end, in this embodiment, the external control terminal 21-1 of the controller 2-1 constituting the image display unit 10-1 is connected to the computer 20 through a connector 22, and the output terminal 23-1 of the controller 2-1 is connected to the external control terminal 21-2 of the controller 2-2 constituting the image display unit 10-2. In the same manner, the output terminals of different controllers are connected to the external control terminals of another controller in order, in such a manner that a plurality of controllers are coupled to the external control device 20 in series.

Figure 5:
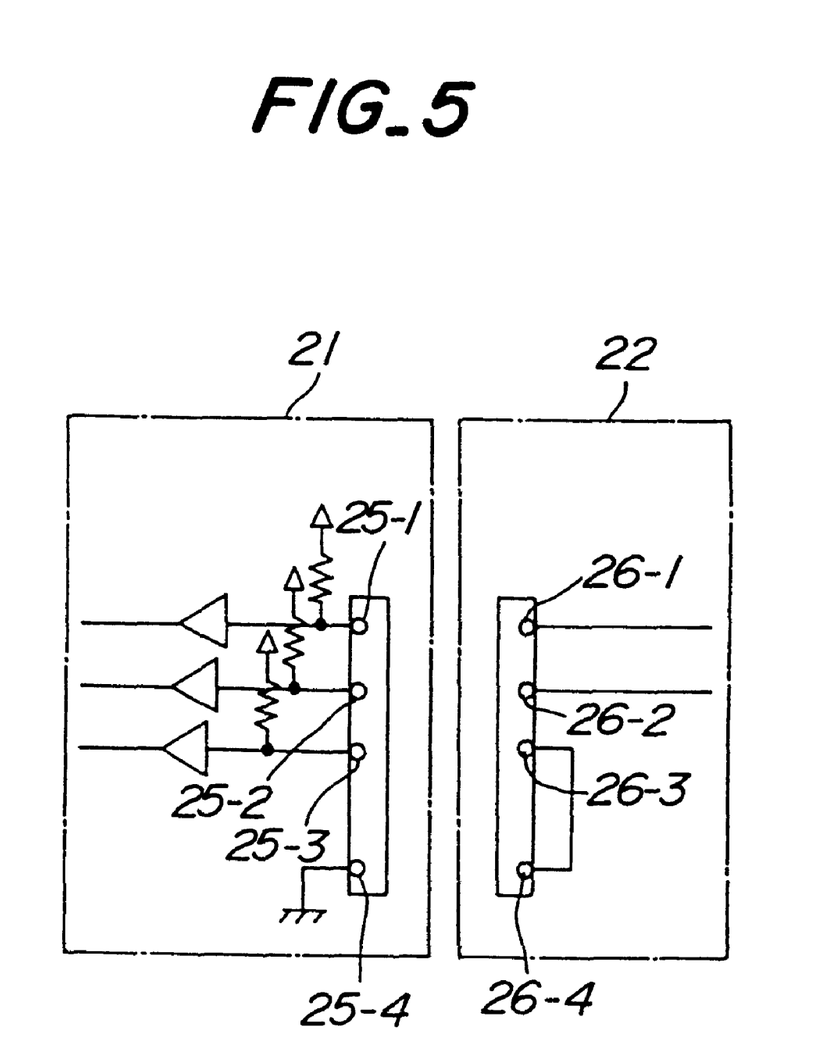
FIG. 5 is an explanatory view explaining the construction for detecting presence of a connection between a controller and a computer in the first embodiment of the image display system according to the present invention.

In this embodiment, also, the fact that the external control terminals of respective controllers have been coupled to the computer 20, is detected, and then the mode control due to the computer 20 is made preferential. To this end, as shown in FIG. 5, respective external control terminals 21 are provided with two terminals 25-1, 25-2 for receiving the mode control signal of two bits (S1, S2) from the computer 20, and with two terminals 25-3, 25-4 for detecting the coupling of the external control terminal 21 to the computer 20 and for generating a priority order control signal (S3), the terminal 25-4 being grounded. The connector 22 connected to the computer 20 is provided with terminals 26-1, 26-2 to be connected to the terminals 25-1, 25-2 of the external control terminal 21 and for supplying the mode control signals, and terminals 26-3, 26-4 to be connected to the terminals 25-3, 25-4, the terminals 26-3, 26-4 being short-circuited to each other.

In this way, as shown in Table 2, the priority order control signals S3 having high level (H) in case of not being connected the external control terminal 21 to the connector 22, and having low level (L) in case of the external control terminal 21 being connected to the connector 22, can be obtained from the terminal 25-3 of the external control terminal 21, so that in the mode switching control circuit of respective image display units 10, it is possible to select whether the mode control is performed by the mode switching unit provided on the HMD 1 or the controller 2 individually or by the computer 20 collectively and forcibly on the basis of the signal level conditions (H, L) of the thus obtained priority order control signals S3.

Figure 6:
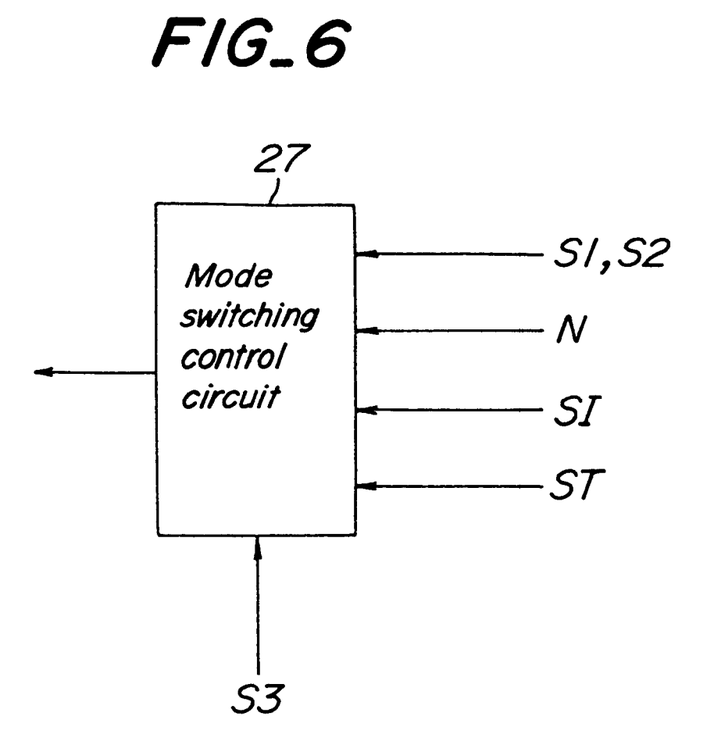
FIG. 6 is an explanatory view showing one embodiment of a mode switching control circuit shown in the first embodiment.

One embodiment of such a mode switching control circuit is shown in FIG. 6. This mode switching control circuit 27 receives mode control signals of two bits (S1, S2) supplied to the terminals 25-1, 25-2 of the external control terminal 21 from the computer 20, the priority order control signal (S3) generated by the coupling of the connector 22 to the the external control terminal 21 and obtained from the terminal 25-3, and mode control signals of respective operation modes of normal (N), superimposition (SI) and see-through (ST) each obtained by the operation of the mode switching units 6 provided to the image display units 10 themselves, so that the operation modes are controlled in order by the mode control signals (N, ST, SI) obtained by the operation of the switch of the image display units 10 themselves in the case of the priority order control signal S3 being H level, and on the basis of the mode control signal of two bits from the computer 20 in the case of the priority order control signal S3 being L level.

The mode control signals of two bits (S1, S2) outputted from the computer 20 are set by a combination of signal levels of respective bits, for example, as shown in following Table 2.

TABLE 2

| Signal Level | | | | |
|---|---|---|---|---|
| S1 | S2 | S3 | Operation Mode | Control Mode |
| L | L | L | Normal (N) | Forcible and |
| H | L | | See-through (ST) | Collective |
| L | H | | Superimposition (SI) | Control |
| H | H | H | (N), (ST), (SI) | Individual Control |

According to the embodiment of the present invention, the controllers 2-1, 2-2, 2-3, . . . of an optional plurality of image display units 10-1, 10-2, 10-3, . . . are coupled to one computer 20 in series through the external control terminals 21-1, 21-2, 21-3, . . . and output terminals 23-1, 23-2, 23-3, . . . of respective controllers, so that the operation modes of all HMDs 1-1, 1-2, 1-3, . . . can be collectively and forcibly controlled by the computer 20 through the respective controllers, and thus can be corresponded to the number of the image display units 10, that is, the number of HMDs 1 easily.

In this embodiment, also, the operation modes can be directly addressed from the computer 20 so that in the single use of the image display unit 10, even when the operation modes are switched in the order to, normal, superimposition and see-through modes, every operation of the mode switching unit, the operation modes can be switched from the normal mode to the see-through mode, immediately. Therefore, for example, for plural unfamiliar viewers, the system that the see-through mode is set according to a certain curriculum, can be constructed. As in the conventional system, moreover, it is not necessary for the controllers 2 themselves to have a function for controlling the operation modes of the HMD 1 forcibly from the outside, so that respective image display units 10 can be constructed cheaply.

Figure 7:
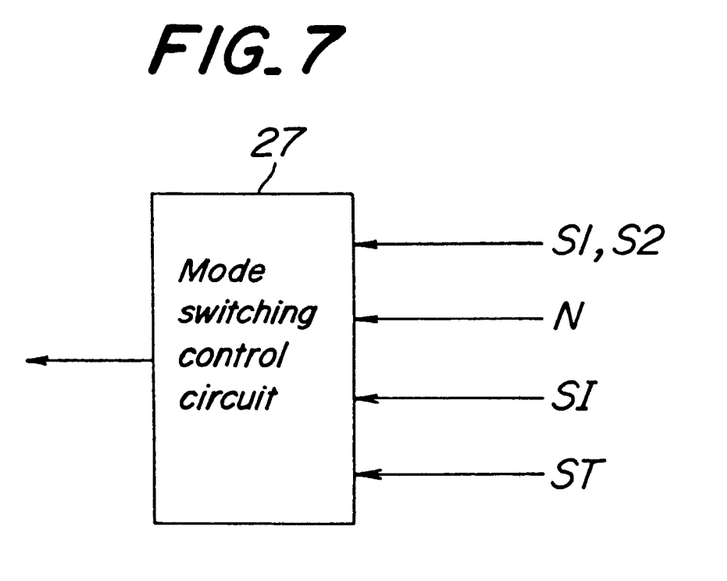
FIG. 7 is an explanatory view showing one embodiment of a mode switching control circuit shown in a second embodiment of the image display system according to the present invention.

In a second embodiment of the image display system according to the present invention, for the construction of the image display system shown in the first embodiment, it is optionally possible to select the collective control of operation modes due to the computer 20 and the individual control of operation modes due to the respective image display units 10, on the basis of the mode control signals from the computer 20, without detecting whether the external control terminals 21 of respective controllers 2 are coupled to the computer 20 or not. To this end, in this embodiment, the connector 22 shown in FIG. 5 is not used, the external control terminals 21 of respective controllers 2 are directly connected to the computer 20, the mode control signals S1, S2 having each signal level being H level are derived selectively from the computer 20 as a mode control signal of two bits, and as shown in FIG. 7, these mode control signals are supplied to a mode switching control circuit 27 through the external control terminals 21 of respective controllers 2.

The mode switching control circuit 27 also receives the mode control signals of respective operation modes of normal (N), superimposition (SI) and see-through (ST) each obtained by the operation of mode switching units 6 provided on the corresponding image display units 10 themselves, so that the mode control signals from the computer 20 are observed in the mode switching control circuit 27. Therefore, if both mode control signals of two bits (S1, S2 have, a signal level of H level, the mode control signals (N, ST, SI) obtained by the operation of the switch of the image display units themselves by the viewer have a priority, thereby individually and sequentially controlling the operation modes, and if at least one of the mode control signals S1, S2 has an L level, the mode control due to the computer 20 has a priority, thereby collectively and forcibly controlling the operation modes according to Table 2 on the basis of the mode control signals of two bits.

According to this embodiment, without detecting whether the external control terminals 21 of respective controllers 2 are coupled to the computer 20 or not, the collective and forcible control of the operation modes of all HMDs 1 and the control of operation modes of the corresponding HMDs 1 due to respective image display units 10 themselves can optionally be switched, thereby obtaining an inexpensive system construction. Moreover, under the state of coupling whole image display units 10 to the computer 20 in series, the priority order of the mode control due to the computer 20 and the mode control due to respective image display units 10 themselves can be controlled, thereby increasing the freedom of the system.

Therefore, for example, the operation mode may be switched to the superimposition mode and the see-through mode according to a curriculum or a software control, on the way of operation, for the plural image display units during operation at respective optional operation modes, so that it is possible to construct a system entering the superimposition mode at game-over, and entering the see-through mode forcibly under an urgent condition.

Moreover, a system for switching the image voice sources (supply sources) may be added by means of conventional ways. Commonly, a plurality of image voice sources may be connected to a controller of the image display unit through a selector to select the sources by channels of the selector. By using this selector, for example, the mode control may be performed and the voice may be changed to another voice source such as a microphone. Moreover, as a function of respective image display units, an automatic volume muting function may also be provided in such a manner that the sound volume level is automatically decreased. This means that the caution of the viewer may be directed to the external sight visually and audibly, irrespective of the condition of the voice source.

Figure 8:
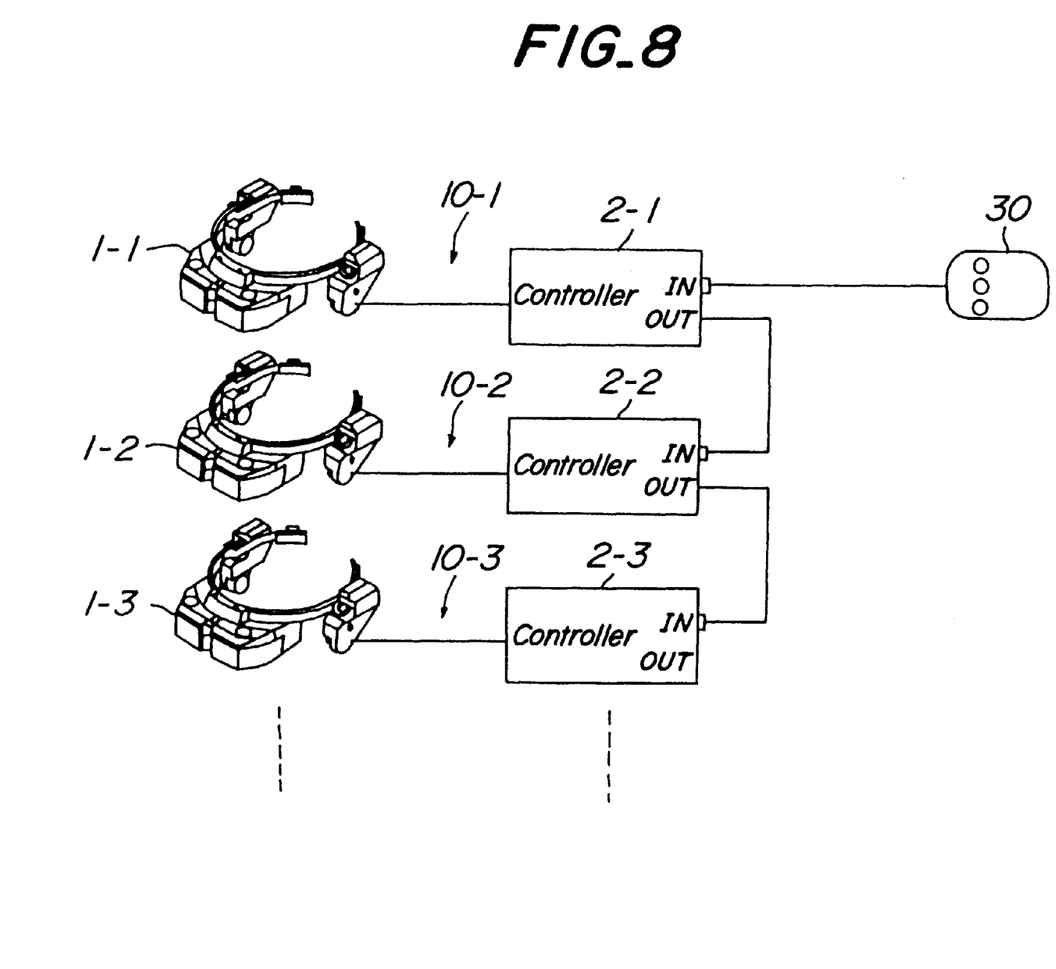
FIG. 8 is an explanatory view showing the construction of a third embodiment of the image display system according to the present invention.

FIG. 8 shows a third embodiment of the present invention. This embodiment utilizes a remote controller 30 instead of the computer 20 as an external control device in the construction of the image display systems shown in the first and second embodiments. Therefore, according to this embodiment, it is possible to obtain the same effect as in the first and second embodiments. In this case, the remote controller 30 generates the mode control signals of two bits (S1, S2) in the same manner as the computer 20, so that the priority order for the mode control due to the remote controller 30 and the mode control due to respective image display units 10 themselves can be controlled in the same manner as in the second embodiment.

Figure 9:
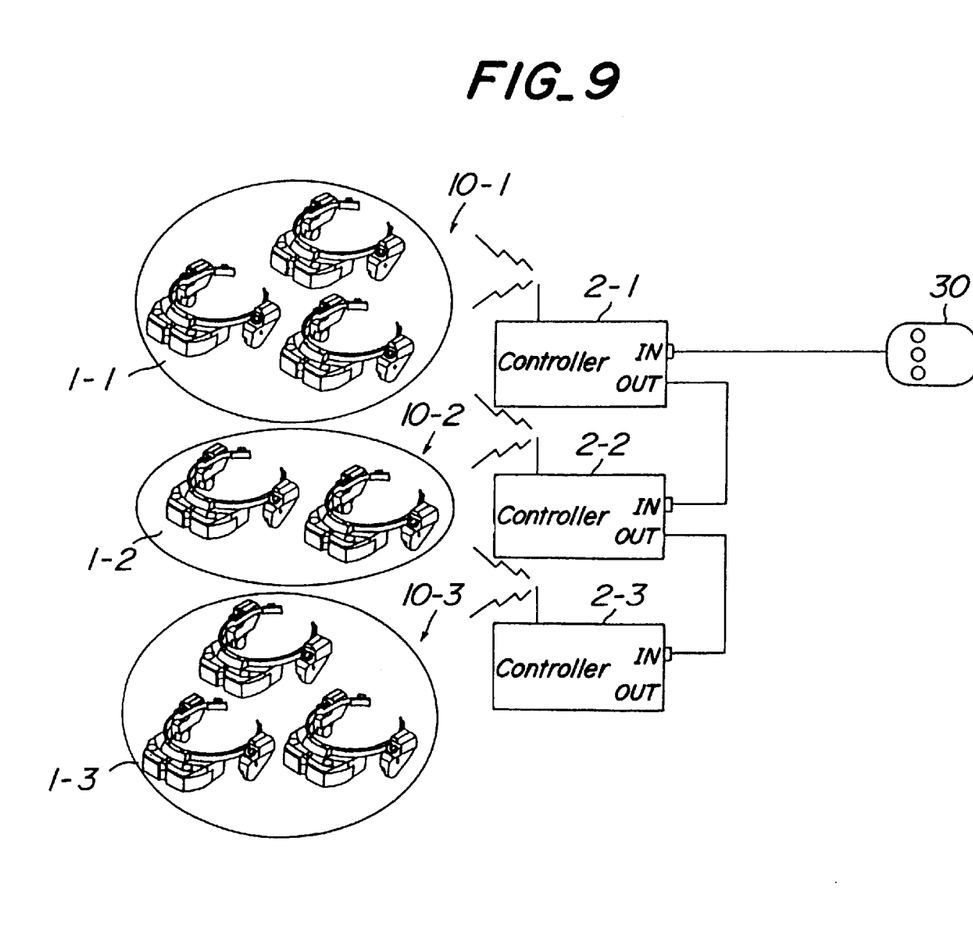
FIG. 9 is an explanatory view showing the construction of a fourth embodiment of the image display system according to the present invention.

FIG. 9 shows a fourth embodiment of the image display system according to the present invention. This embodiment has the same construction as that of the third embodiment except that respective image display systems 10 comprise a plurality of HMDs 1 and one controller 2 for controlling HMDs commonly, with the transfer of signals between the controller 2 and the plural corresponding HMDs being performed by a radio system. Moreover, respective controllers 2 can supply different menus. Therefore, even in this embodiment, the priority order of the mode control can be changed under an urgent condition to switch all HMDs 1 to the see-through mode forcibly, in the same manner as in the second and third embodiments.

Figure 10:
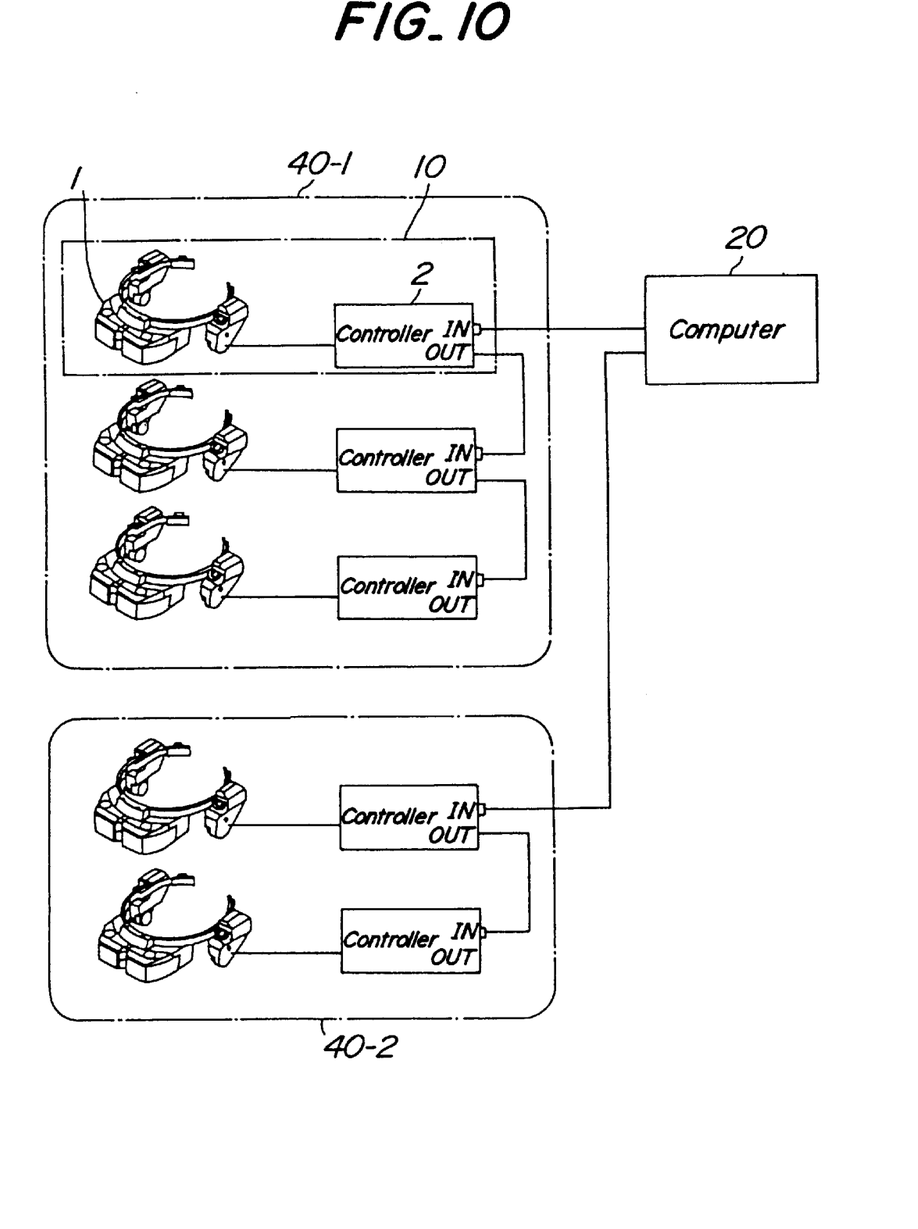
FIG. 10 is an explanatory view showing the construction of a fifth embodiment of the image display system according to the present invention.

FIG. 10 shows a fifth embodiment of the image display system according to the present invention. In this embodiment, a plurality of image display units 10 shown in FIG. 1 are coupled in series to form the plural (in this embodiment, two) image display unit groups 40-1, 40-2, these image display unit groups 40-1, 40-2 are connected to one computer 20 in parallel, so that the computer 20 performs different mode control between different image display unit groups and collective control in the same image display unit group. In this embodiment, also, all HMDs 1 may be switched forcibly and collectively to the see-through operation mode.

It is further understood by those skilled in the art that the present invention is not limited to only the above described embodiments and that various changes and modifications may be made in the invention without departing from the spirit and the scope thereof. For example, in the first embodiment, the remote controller 30 can be used instead of the computer 20 in the same manner as in the third and fourth embodiments. In the fourth embodiment, also, the computer 20 is used instead of the remote controller 30, to detect whether the controller 2 of respective image display units 10 is coupled to the computer 20 or not in the same manner as in the first embodiment, thereby controlling the priority order of the mode control due to the controller 20 and the mode control due to respective image display units 10 themselves. In the first, second and third embodiments, moreover, the transfer of the signals between the HMD 1 and the controller 2 of respective image display units 10 may be performed by the radio system in the same manner as in the fourth embodiment and in the fifth embodiment, respective image display unit groups may be constructed by one or a plurality of image display units. In respective image display units 10, also, the mode switching unit operated by the viewer may be provided to either one of HMD 1 or the controller 2.

What is claimed is:

1. An image display system comprising:
    (a) a plurality of image display units, each respective display unit including a respective individual controller for outputting a plurality of image signals, and at least one display means for enabling a switching operation with a predetermined operation mode of a plurality of operation modes including a mode for indicating the plurality of image signals output from said respective individual controller;
    (b) an external control device for outputting mode control signals which address the operation mode of the display means, the individual controller of each of the respective image display units including an external control terminal for receiving the mode control signals and an output terminal for outputting the mode control signals supplied to the external control terminal, and the output terminals of each respective individual controller being connected to the external control terminal of another one of said individual controllers in turn so as to couple said individual controllers to the external control device in series, a particular one of said individual controllers in said series having its external control terminal connected to the external control device, and the operation modes of all of said display means being collectively and forcibly controlled through said individual controllers on the basis of the mode control signals from the external control device; and (c) a detection means for detecting a coupling condition of the external control terminals of each of said individual controllers to the external control device, said individual controllers controlling the operation modes of the respective display means corresponding thereto collectively and forcibly by the mode control signals from the external control device, on the basis of the output of the detection means.

2. An image display system as claimed in claim 1, wherein the plural operation modes include a see-through operation mode.

3. An image display system as claimed in claim 1, wherein the external control device is constructed by a computer or a remote controller.

4. An image display system as claimed in claim 1, wherein the image display means is a head-mounted display unit.

5. An image display system as claimed in claim 1, wherein the plural operation modes include a mode for operating a voice mute function.

6. An image display system as claimed in claim 1, wherein the image display means comprises image display elements for displaying an electronic image, an optical system including a beam splitter for leading the electronic images displayed on the image display elements onto eyes of the viewer, and a shutter means disposed at the opposite side to the eyes of the viewer from the beam splitter, and wherein the plural operation modes include a normal mode for rendering the shutter means to shielding condition and for displaying the electronic image on the image display elements; a superimposition mode for rendering the shutter means to transmitting condition and for displaying the electronic image on the image display elements; and a see-through mode for rendering the shutter means to transmitting condition and for not displaying the electronic image on the image display elements.

* * * * *

UNITED STATES PATENT AND TRADEMARK OFFICE
CERTIFICATE OF CORRECTION

PATENT NO.    : 6,331,841 B1  
DATED         : December 18, 2001  
INVENTOR(S)   : Tokuhashi et al.

It is certified that error appears in the above-identified patent and that said Letters Patent is hereby corrected as shown below:

<u>Title page,</u>  
Item [22], Filed, the filing date is erroneously given as May 25, 2000.  
Please correct the filing date of the patent as follows:  
-- [22] Filed: May 30, 2000 --.

Signed and Sealed this

Twenty-seventh Day of August, 2002

*Attest:*

JAMES E. ROGAN  
*Attesting Officer*   *Director of the United States Patent and Trademark Office*